(12) United States Patent  (10) Patent No.: US 7,853,551 B1
Gill  (45) Date of Patent: Dec. 14, 2010

(54) NATURAL LANGUAGE KNOWLEDGE PROCESSOR USING TRACE OR OTHER COGNITIVE PROCESS MODELS

(76) Inventor: Susan P. (Zann) Gill, P.O. Box 4001, Los Altos, CA (US) 94024

( * ) Notice: Subject to any disclaimer, the term of this patent is extended or adjusted under 35 U.S.C. 154(b) by 862 days.

(21) Appl. No.: 11/733,736

(22) Filed: Apr. 10, 2007

Related U.S. Application Data

(63) Continuation-in-part of application No. 10/602,824, filed on Jun. 25, 2003, now abandoned.

(60) Provisional application No. 60/391,861, filed on Jun. 25, 2002.

(51) Int. Cl.
*G06F 17/00* (2006.01)
*G06N 7/00* (2006.01)
*G06N 7/08* (2006.01)

(52) U.S. Cl. .................................... 706/55

(58) Field of Classification Search .................. 706/55
See application file for complete search history.

(56) References Cited

U.S. PATENT DOCUMENTS

2004/0098357 A1* 5/2004 Higgins et al. ............ 706/45

OTHER PUBLICATIONS

'Archetypes in Man-Computer Problem Solving': 1969, IEEE, Miller, pp. 219-241.*

* cited by examiner

*Primary Examiner*—Michael B. Holmes
*Assistant Examiner*—Peter Coughlan
(74) *Attorney, Agent, or Firm*—Fernandez & Associates, LLP

(57) ABSTRACT

A computer implemented method for process data management displays a set of natural language questions and provides an organizational framework for passively and actively collecting natural language information so users can coordinate problem-solving and project development. It addresses the application domain of collaborative group process and/or collaborative intelligence among humans and/or intelligent agents. In one embodiment, the method collects responses to the trigger questions; displays natural language reaction questions relating to collection of reactions to the triggers and receiving responses to the reaction questions; receives inputs of action steps to address the problem based on the triggers and reactions; guides the user to identify conflicts based on the triggers, reactions, and actions steps; generates a navigable map based on the triggers, reactions, actions steps, and conflicts for use to support and track the problem-solving process; and displays prompts for evaluating the problem based on the map.

24 Claims, 8 Drawing Sheets

Fig. 3 TRIGGER STAGE
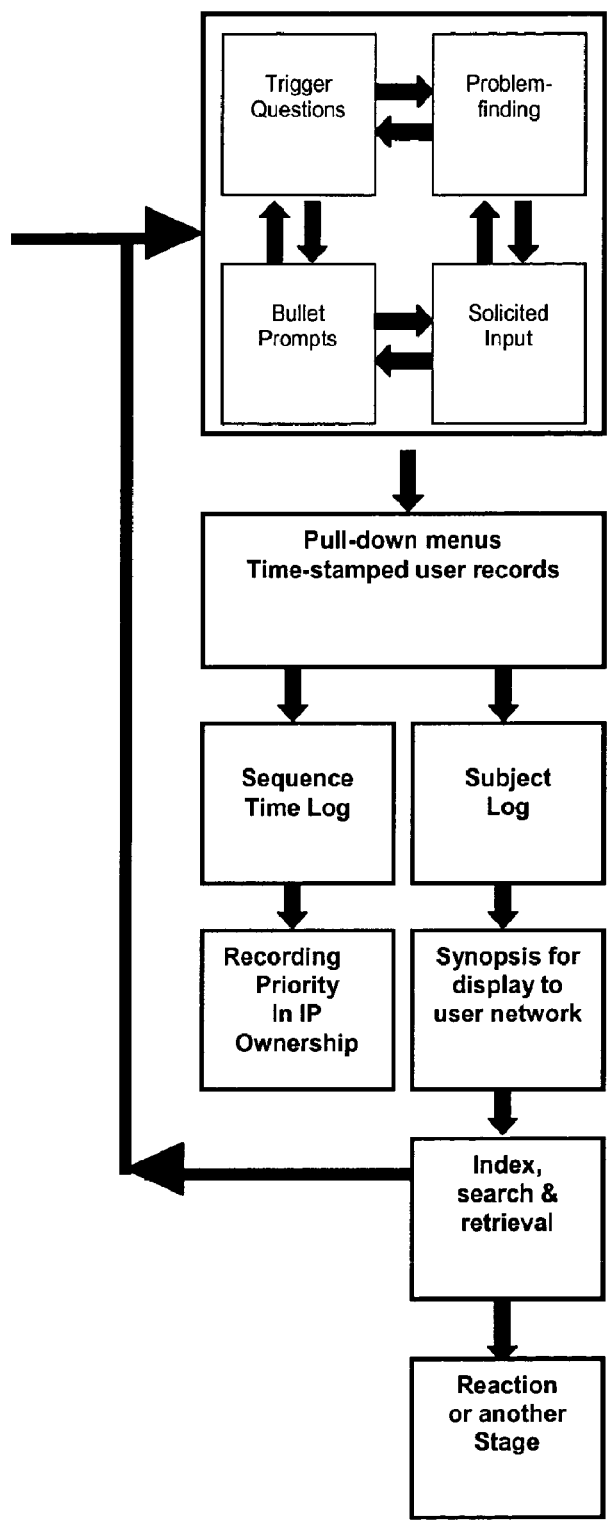

Fig. 4 REACTION STAGE
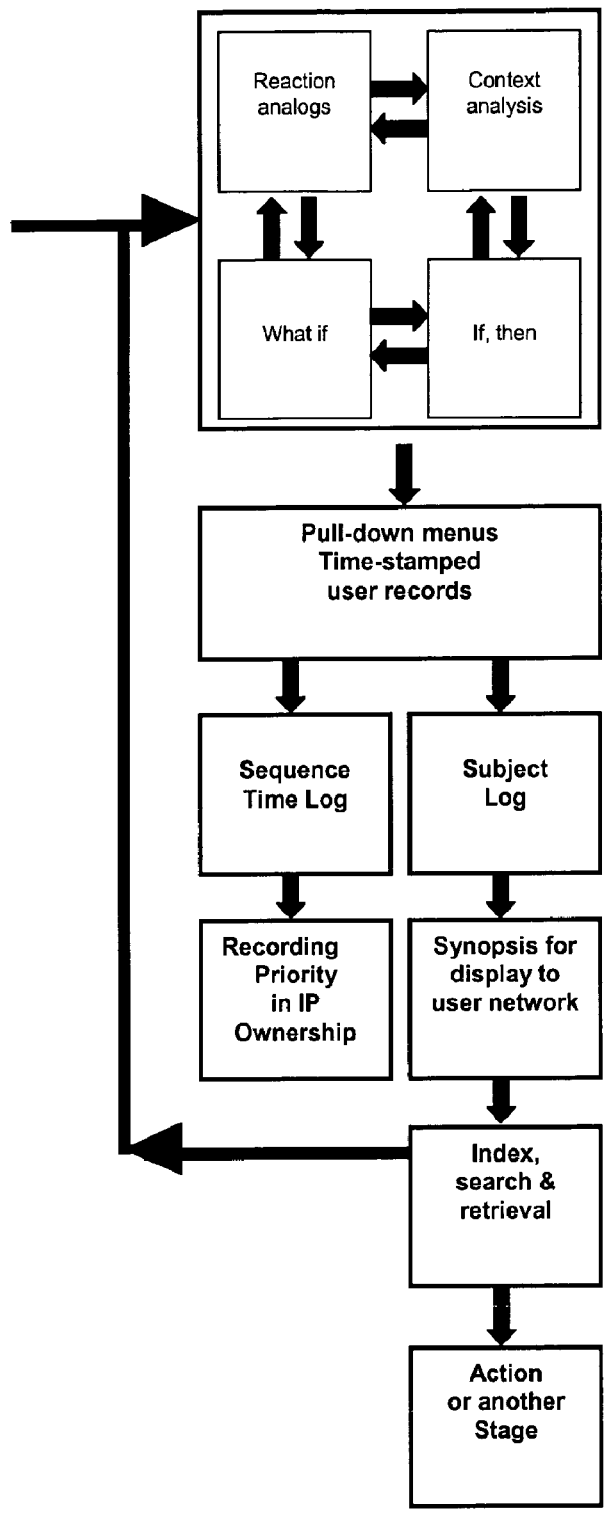

Fig. 5 ACTION STAGE
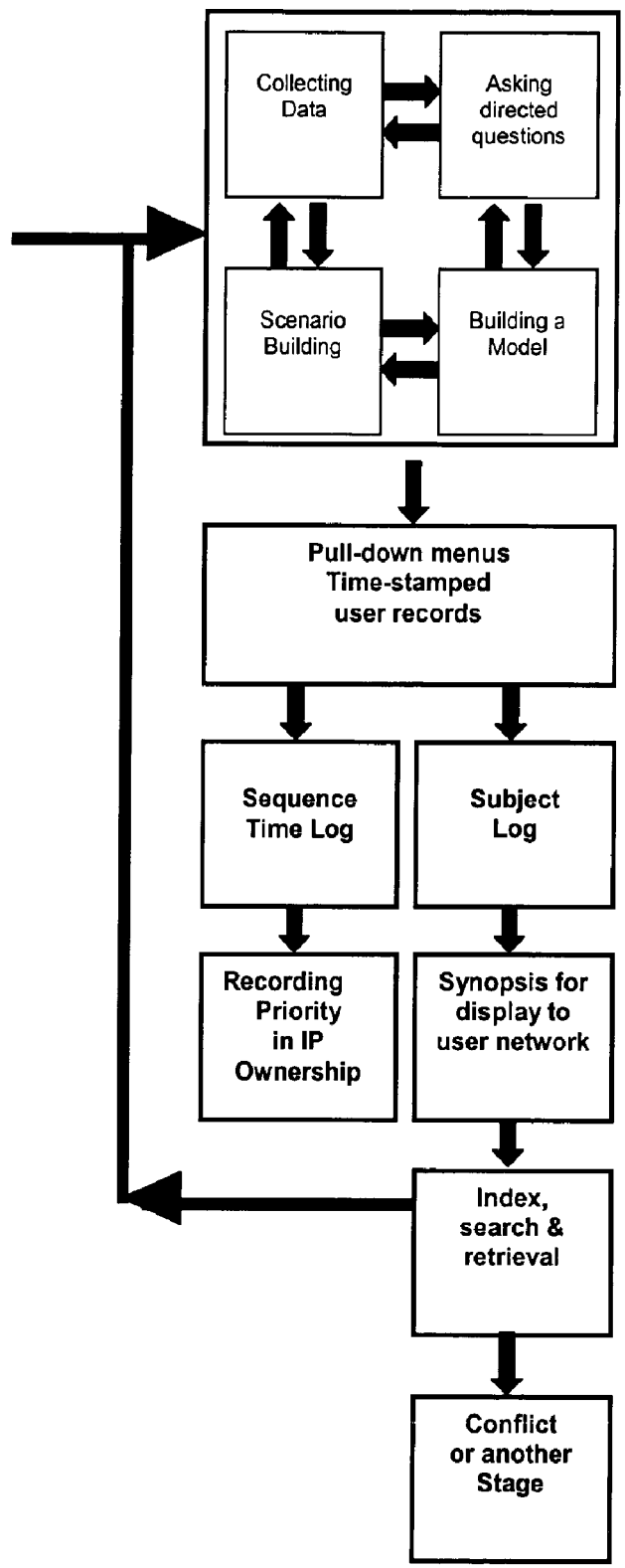

Fig. 6 CONFLICT STAGE
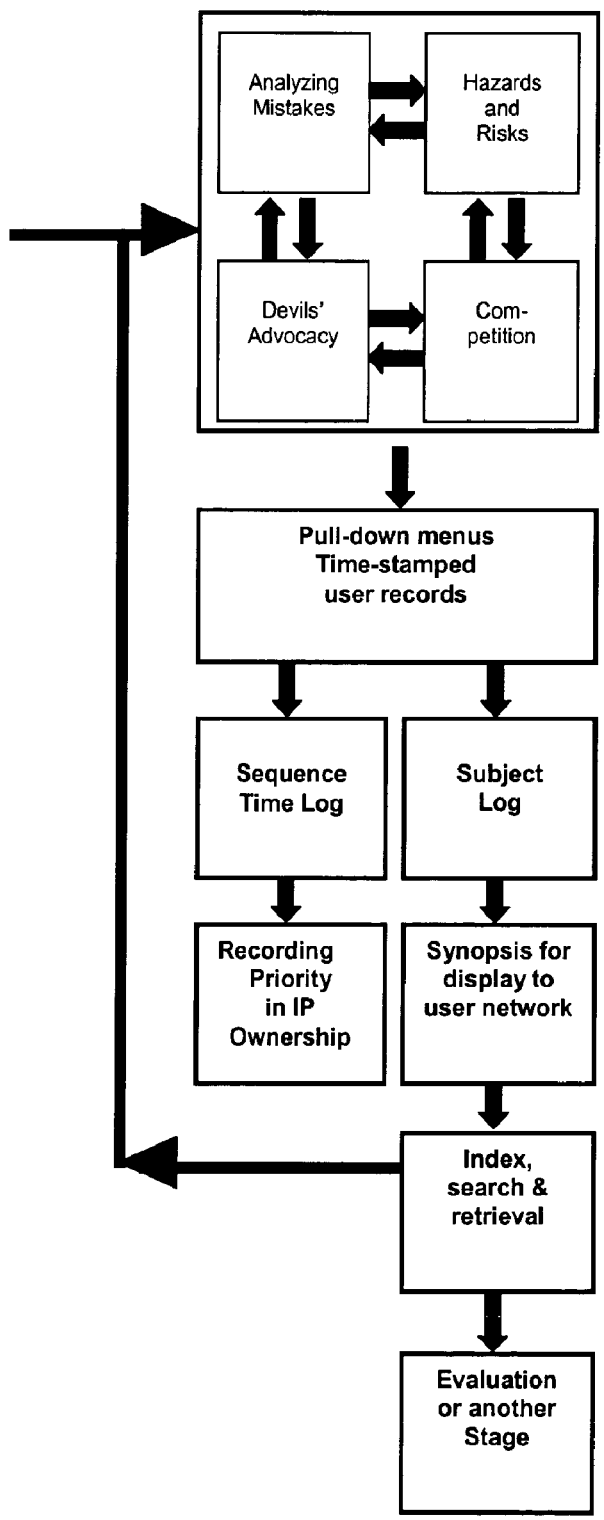

Fig. 7 EVALUATION STAGE
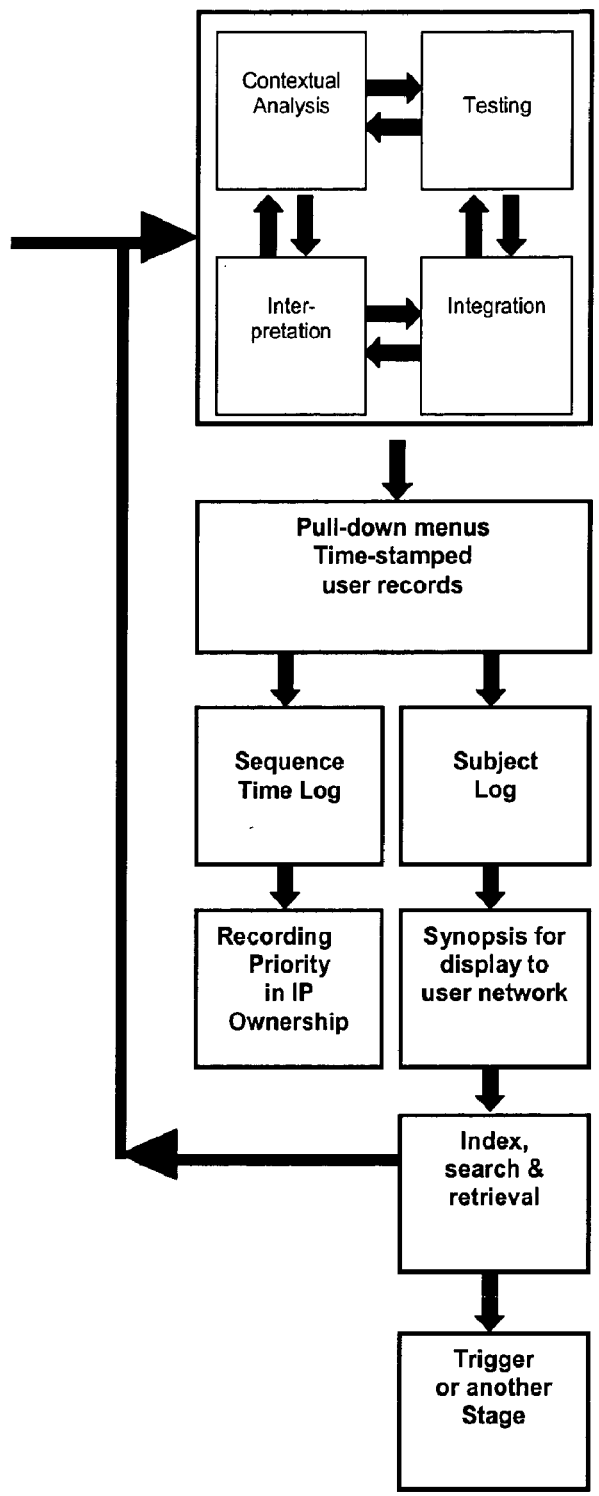

Fig. 8 DUAL MODE INTERFACE WITH TOGGLE FUNCTION
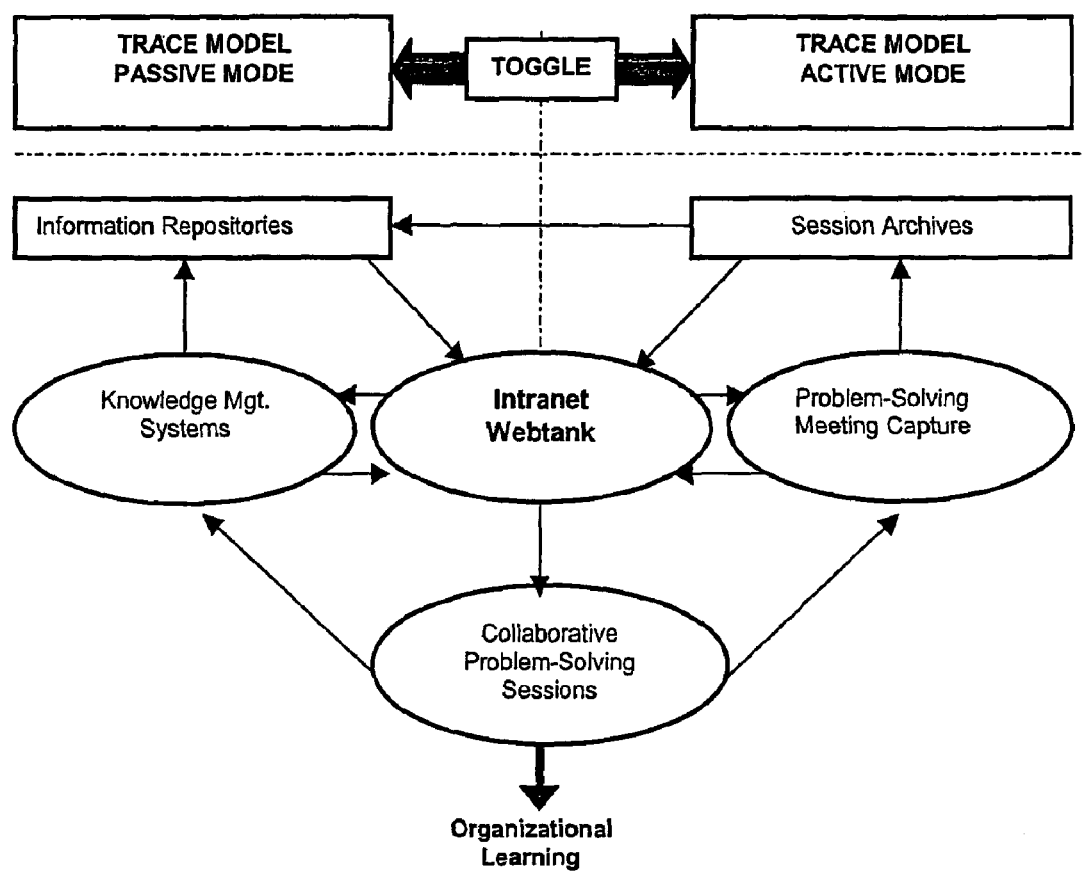
TRACE cognitive model: passive and active modes of use

NATURAL LANGUAGE KNOWLEDGE PROCESSOR USING TRACE OR OTHER COGNITIVE PROCESS MODELS

CROSS-REFERENCE TO RELATED APPLICATIONS

This application is a continuation-in-part to U.S. patent application entitled, "TRACE Cognitive Process Model and Knowledge Processor", Ser. No. 10/602,824, filed on Jun. 25, 2003 now abandoned and further claims priority to U.S. Provisional Application Ser. No. 60/391,861 filed Jun. 25, 2002 on which 10/602,824 claims its priority.

BACKGROUND

1. Field

This invention relates to a natural language system and method for individually adapted learning, problem-solving, project or program development and knowledge management, as well as enabling asynchronous collaboration among users of its Knowledge Processor.

2. Related Art

Knowledge Processing is defined as the systematic discovery, development, exchange, and application of knowledge by humans and/or their agents. Knowledge Processors facilitate knowledge development through natural language dialoging with the user in an interactive exchange. Research, learning/teaching, and problem-solving have in the prior art been inadequately supported because of over-reliance on pre-established knowledge domain categories. Traditionally, "expert systems" made decisions by matching user queries to a static database of information. Often specialist interaction with the expert system required answering questions in the order posed by the system, which failed to maximize the value of specialist input. While Case-Based reasoning (CBR) addressed many of these limitations by linking problem definition to the problem solution process, the focus was still on analysis within narrow, well-defined domains. In the prior art, systems are used to repeatedly perform the same function, such as diagnosing machine malfunction based on vibrational data. These systems do not grow, evolve, or become more complex with increasing use, i.e., they are not evolving structured-through-use Knowledge Processors.

The prior art typically focuses on diagnosis of machine malfunction, with systems designed to review received diagnostic data, such as machine vibrations, to determine recovery methods. However, they do not address the application domain of collaborative group process and/or collaborative intelligence among humans and/or intelligent agents.

Accordingly, there exists a need for a natural language, knowledge-based decision support method and system for solving problems. The method and system should present a natural language guidance framework that can be incorporated into diverse software packages, e.g. for planning, project development, project-focused learning, brainstorming facilitation, work process monitoring, menu-based queries, and submission tracking. The method and system should be projective, providing guidance to optimize future decision-making based upon past knowledge. The invention described herein addresses this need.

SUMMARY

A computer implemented method for process data management, which in one embodiment displays a set of natural language trigger questions relating to identification of triggers for a problem and receiving responses to the trigger questions; displays a set of natural language reaction questions to collect reactions to the triggers and receive responses to the reaction questions; receives inputs of action steps to address the problem based on the triggers and the reactions; guides the users to identify conflicts based on the triggers, the reactions, and the actions steps; generates a navigable map based on the triggers, reactions, action steps, and conflicts for use to support the problem-solving process; and displays prompts for evaluating the problem using the map. It provides an organizational framework for passively and actively collecting natural language information so users can coordinate problem-solving and project development for various types of projects. It addresses the application domain of collaborative group process and/or collaborative intelligence among humans and/or intelligent agents.

BRIEF DESCRIPTION OF DRAWINGS

FIG. 3 is the flow diagram illustrating an embodiment of the TRACE cognitive process model in phase one, the Trigger.

FIG. 4 is the flow diagram illustrating an embodiment of the TRACE cognitive process model in phase two, the Reaction.

FIG. 5 is the flow diagram illustrating an embodiment of the TRACE cognitive process model in phase three, the Action.

FIG. 6 is the flow diagram illustrating an embodiment of the TRACE cognitive process model in phase four, the Conflict.

FIG. 7 is the flow diagram illustrating an embodiment of the TRACE cognitive process model in phase five, the Evaluation.

FIG. 8 is the block diagram of an embodiment of the complementary relationship between the passive and active roles of the TRACE cognitive process model.

DETAILED DESCRIPTION

Figure 1:
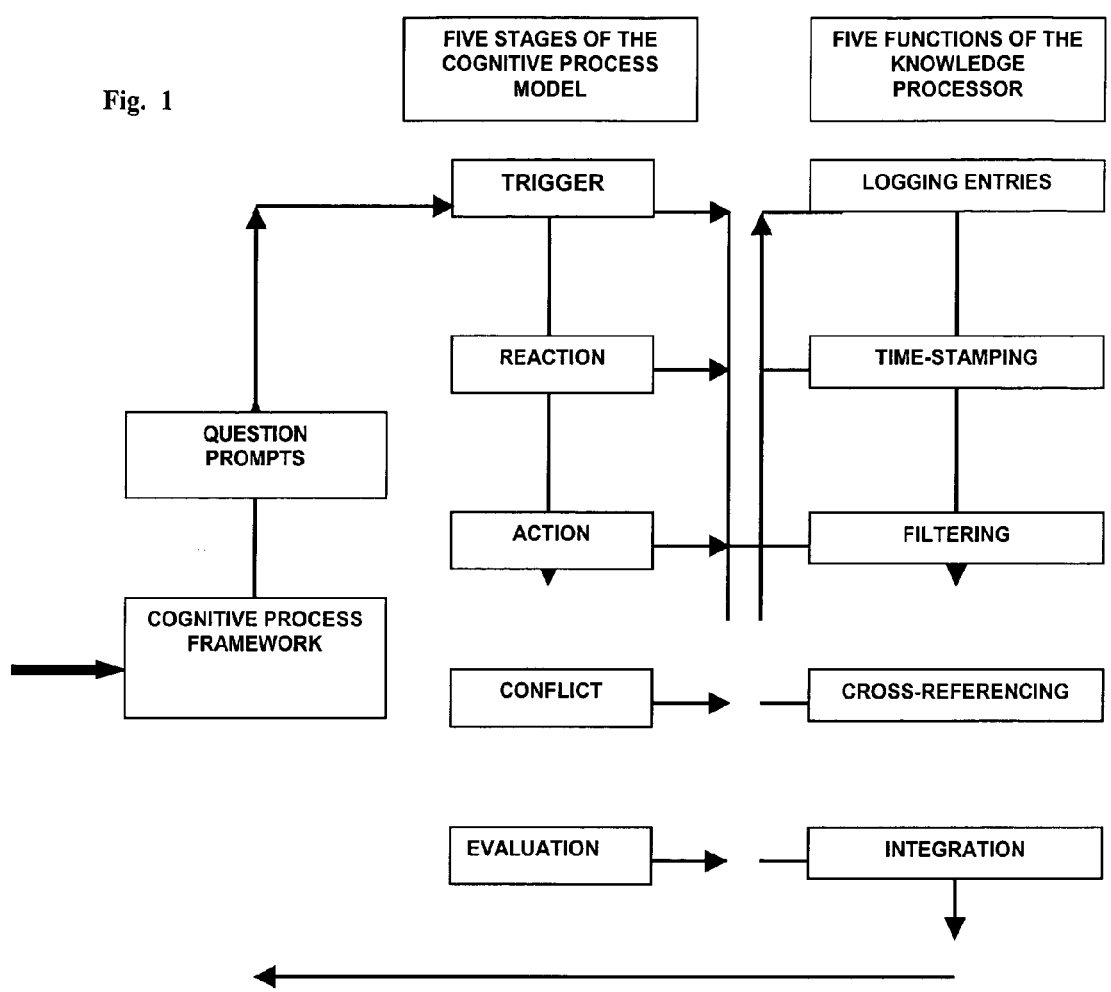
FIG. 1 is an architectural block diagram illustrating the five stages of the TRACE cognitive process model and its associated knowledge processor

The following description sets out specific details to clarify present embodiments of the invention. However, those of ordinary skill in the art will appreciate that the invention may be practiced without these specific details.

The method and system of the invention presents a natural language guidance framework that can be incorporated into diverse software packages, e.g., for planning, project development, project-focused learning, brainstorming facilitation, work process monitoring, menu-based queries, and submission tracking. The method and system uses navigable, hyperlinked maps to show data links, and supports individual contributors and collaborative group process in order to boost individual creativity, C-IQ (collaborative intelligence) and team effectiveness through providing frameworks for recording, accessing, and assessing process data. The system can be a cross-platform natural language system to manage multiple data formats for collaboration and traceability, providing a platform for process data management.

In one embodiment, a menu-based, or similarly pre-structured query system, organizes collaborative knowledge sharing, streamlines user profiling, and preserves credit attribution, facilitating sharing of information and ideas during project development by collaborative teams, and publication of logged, time-stamped entries to a gallery or library.

Applications for the Knowledge Processor include, but are not limited to:

- Workflow process tracking as part of a software package, providing templates and a framework for workflow process tracking and monitoring;
- Interactive Frameworks for Decision Support (IFDS) in complex systems, such as decision-making by diverse organizations, e.g. for environmental sustainability;
- Self-Monitoring and Project Guidance as a back end analysis and collaboration tool supporting front end strategic development with stakeholder interviews to identify problems, resources, and issues and develop recommendations;
- Embedded Continual Assessment, providing iterative feedback to guide new product and process development;
- Menu-based Query System for Knowledge Sharing to facilitate collaborative knowledge sharing and preserve credit attribution, enabling better sharing of information and ideas during project development by collaborative teams;
- Submission tracking through construction of navigable, hyperlinked maps;
- Project-focused learning in curriculum for internet-connected schools, enabling student teams to input their process records and archive final projects into a resource library so students can learn from final projects that preceded them and share their work with student teams in other locations.

At each stage of the process, screen displays contain sets of categories under which are listed prompt questions. Each prompt has a pull-down menu for the reply, which is logged in sequence, enabling review of the user's problem-solving process. The stages can be repeated many times, and in any order required, during development of the problem-solving strategy. In one embodiment, the displays include a pull-down menu or other means to respond to queries on which question boxes are checked. The user can customize templates for these menus, extend the question base, or input new categories to the framework.

The question prompts receive natural language input, which is tagged into generic process categories or sub-categories where it can be compared with other input in related categories. Tracking functions support individual contributors and provide guidance in the form of updated queries and process records so that individual work is tagged, easily accessed, and integrated into a larger framework to create a semantic knowledge network. The prompts solicit and guide user input, coordinating multi-user input in work processes, while maintaining process records by tagging action types. The responses are mapped into a directed graph, linking relevant issues. The graph nodes are metatagged, searchable and clickable to related data, enabling review of the problem-solving process to date for contextual analysis, testing, integration, and interpolation.

In one embodiment, the system enables process records to be searched, not only by content key words, but also by natural language queries and process categories. An active mode-passive mode switch is coupled to submission tracking. Entries can remain in active mode for wiki-type collaboration. Or the user can opt to create a transaction log, which dates and time-stamps entries, after which they are published and locked in permanent archive records. This feature enables correct IP attribution when desired by the user.

In one embodiment, every navigation connection made adds a new correlation link. So it is possible to correlate action steps with the passive data items queried to review those action steps as the project develops and the system grows and evolves through use.

In one embodiment the user can toggle between active and passive modes, which are cross-linked. While the prior art allows agents to choose between stored files and an automated expert system, this is merely the choice between two alternatives, not a toggle function. In the subject invention, cross-functional mapping between currently active input and the passive knowledge base of the system enables the user to see how his present work in progress relates to past work done in the system. Active content may become passive and vice versa.

In one embodiment the user can switch between stages to facilitate work on a project. Prior art teaches the capacity to enter a selection of information to be viewed and "press return." This is equivalent to the choice on any website of which links to click. In this invention, cross-referenced entry links in the user's path between stages are recorded for traceability, so the history can be reviewed as a record of the problem-solving process and as a problem-related network.

In one embodiment, the system provides user-modifiable templates for self-monitoring and project guidance, coordinating, structuring interim assessment and integrating results from a front end strategic development process that entails stakeholder interviews to identify problems, resources, issues and to develop project recommendations as the system scales up for participation by larger groups.

In one embodiment, submission tracking templates and time-stamping enable Embedded Continuous Survey of the work process by colleagues, instructors or supervisors, so that the work process can be assessed in process as needed.

The architecture of one embodiment of the present invention is comprised of five stages, with prompts at each stage:

| | |
|---|---|
| 1. Trigger | Startup |
| 2. Reaction | |
| 3. Action | Evolution |
| 4. Conflict | |
| 5. Evaluation | Application and Interpretation |

Stage One. The Trigger in one embodiment initiates user input by introducing a natural language question framework with which to analyze problems or unsatisfactory conditions and look for "triggers for change." In this stage users assess the present situation, inventory needs, conduct background research, ask questions to generate new ideas, and brainstorm. The invention uses natural language prompts in contrast to the prior art, which uses vibrational or other forms of input for diagnosis, e.g. of machine malfunction.

Stage Two. The Reaction in one embodiment introduces the user's biases and perspectives in response to the trigger. It uses natural language questions to gather background, probing the user for proposed actions in response to the trigger. The software guides brainstorming to react to the triggers noted in the first stage, helping users determine criteria for decision-making, and channel direction. The software supports analysis and question-framing to guide decision-making.

Stage Three. The Action in one embodiment offers a natural language method for interim interpretations to develop a method to address the problem. In this stage users define their method and organize their tools. They engage in scenario-building, prepare an implementation plan, and may build a virtual prototype to test. The focus is on defining their method, developing a scenario, and/or designing a prototype. The invention uses natural language prompts.

Stage Four. The Conflict in one embodiment uses negative feedback critique, framed within the natural language system of the subject invention to guide and redirect the evolving search process so that it converges toward a coherent plan. The software supports users in distributed online focus groups or brainstorming teams, providing templates to document the critique of devils' advocates. By providing a format wherein an internet or intranet feedback system can be used and critical assessment can be systematically collected, organized, and analyzed, the system of the subject patent makes hazards and risks assessment intrinsic, rather than extrinsic, to the development process.

The software maps conflicting data and priorities as a directed graph, linking relevant issues based upon responses to query prompts. Graph nodes are metatagged, searchable and clickable to related data, analyses of errors, hazards and risks, competitive data, and devils' advocacy critique. By providing a format wherein critical assessment can be systematically collected, organized, and analyzed, the system of the subject patent makes hazards and risks assessment intrinsic, rather than extrinsic, to the development process. The Conflict stage processes all previous inputs to identify conflicting data and priorities.

Stage Five. The Evaluation in one embodiment offers natural language templates to filter what will become part of the outcome and what will be rejected. This stage provides a framework to support final presentation and assessment of future implications and impacts. The Knowledge Processor is automated to generate natural language evaluation questions based upon the input received from users during project development. User input enables the Knowledge Processor to implement alternative evaluation strategies. The system is scaleable via the Internet to enable many team leads to present and a large number of responders to assess. So it is suitable for complex, globally distributed, locally implemented initiatives, such as global environmental sustainability applications. The invention differs from prior art in that it uses natural language query prompts under categories, e.g. usefulness in context, testing, interpretation, and integration, whereas the prior art is mechanistic, e.g. comparing object data to specifications.

In one embodiment the Evaluation stage feeds into the Embedded Continual Assessment function. In one embodiment a series of pull-down query menus can be used or modified as needed.

In one embodiment this fifth stage of the TRACE model concludes the first phase of the user's problem-solving process, signaling an Integration Broker to initiate collaborative transactions through which users share knowledge with other users, developing an integrated plan that combines multiple components. Complementing this active function, in the passive mode completed individual web entries are evaluated and archived by the Integration Broker, with multiple mechanisms for search and matching so the knowledge management framework can grow organically.

In one embodiment relevant knowledge archives are linked to the currently active display as graphic links are created between data nodes based upon patterns of use.

In one embodiment, a shared graphical user interface is provided, incorporating a series of prompts to help users review all aspects of the problem and collaborate more effectively, both independently and in teams, to generate innovative, integrated plans and new inventions. TRACE natural language prompts support brainstorming and track the problem-solving process, providing means for assessment. Assessment capability is needed in a range of applications, such as incorporating the subject invention into intranet environments for distributed workforce teambuilding or into courseware for distance learning. The interface assists the generation and maintenance of organized records to monitor and assess project progress, and to support document co-authoring.

In one embodiment, record-keeping can establish legal evidence of the priority of ideas contributed; natural language entries are time-stamped as they are received.

In one embodiment, the system serves as a natural language framework to structure archives and resources in order to reTRACE problem-solving processes that have occurred in this environment. The TRACE stages provide a framework to archive background information, while time-stamping provides a history log so that researchers can study the problem-solving process in action.

In one embodiment, the system offers a natural language embedded continuous survey capability to assess user preferences and to analyze system effectiveness in use, in order to determine where revision is needed. This continuous survey function can serve diverse users, such as managers, project leaders, instructors, curriculum designers, developers of collaborative web environments, marketing researchers, business strategists, and others.

In one embodiment for web-supported academic curricula, the system promotes four user-driven strategies for learning: speculation and play; project-based learning; sharing ideas in a peer-to-peer collaborative web environment; and synthesis, so that each student contributes one component of a larger, integrated result.

In one embodiment, the system addresses scalability problems inherent in the growth of knowledge systems, providing a framework for distributed self-organization as the system scales up. Users add to the knowledge base of the system, using the system framework to organize their knowledge. They archive their project outcomes (some published to the gallery) as resources for other users.

In one embodiment, the system provides flexibly linked, process-based, overlapping natural language knowledge categories to support more effective search and matching in cross-disciplinary knowledge-building, matching users with others across disciplines whose knowledge and skills complement theirs. Hyperlinked data supports skill identification and collaboration, enabling users to interact with experts in other disciplines around issues that arise as they develop their projects.

Where Case-Based Reasoning relies upon analysis of previous case histories, the TRACE Knowledge Processor supports synthesis of new project plans by means of its natural language query system and capacity to search and access knowledge archives, links, and other resources.

The prior art has typically been restricted in its capacity to learn from the decision-making processes of former users and to function effectively across knowledge domains because of reliance on pre-structured information and pre-established knowledge categories. A clear drawback of prior systems has been their deterministic nature, prompting the user for facts and then applying a series of rules to determine system responses.

In contrast, embodiments of the invention provide for system evolution as users input their knowledge into the system. Because knowledge management systems are typically structured by knowledge domain categories, they lack the capacity to link information across disciplines and across knowledge domains. The rapid growth of knowledge, and the need to support cross-disciplinary innovation, demands systems that can self-organize as they scale up based upon patterns of use, without being constrained by pre-established rules or knowledge domain categories.

The TRACE Cognitive Process Model provides the structure for a process framework that can be used independently, though it is typically embedded in a collaborative web environment (intranet or webtank) where it supports individual work, collaborative problem-solving and also enables the process of problem-solving to be studied and assessed.

Its accompanying TRACE Knowledge Processor can be embodied in a software or web-based system to support the user to make decisions in the process of performing a task. Five knowledge storage areas, corresponding to the five stages of the TRACE Cognitive Process Model, are assessed by a knowledge interpreter.

The TRACE Cognitive Process Model provides a framework to support users to develop innovative problem solutions, both individually and in collaboration with co-located or distributed teams. It enables them to organize, record, track and assess their process. The model also provides the architecture for a Knowledge Processor, which supports human discovery, invention, and innovation—processes of knowledge development.

The Knowledge Processor and the TRACE Cognitive Process Model provide a method and system for individually adapted interactive learning and problem-solving. This method provides for a series of natural language steps and question prompts, structured by the framework of a shared graphical user interface.

FIG. 1 is an architectural block diagram illustrating the five stages of the TRACE cognitive process model and its associated knowledge processor. It is a language-based method or system that can be embodied in software, such as for project development, project-focused learning, brainstorming facilitation, work process monitoring, planning, menu-based query systems, submission tracking, Interactive Frameworks for Decision Support (IFDS), Embedded Continual Assessment, or to generate navigable, hyperlinked maps, said method and system comprising at least one user interface display for each of a number of structured stages, the displays including natural language question prompts to receive user input, the structured stages including a trigger stage which is used to identify problems, a reaction stage which is used to analyze problems by gathering and structuring critique on the input from the trigger stage, an action stage in which the user determines one or more action steps, a conflict stage in which feedback on the action is gathered and hazards and risks identified, and an evaluation stage in which an interim or final assessment of the action is done, the project development software being such that the user can move between the five stages as needed to facilitate work on a project.

In the embodiment shown in FIG. 1, through its process-based information architecture, the TRACE Cognitive Process Model provides a framework for soliciting, receiving, logging, filtering, and integrating input from users, independent of their discipline. The user is prompted to enter responses to a series of natural language question prompts within each of the five phases of the TRACE Cognitive Process Model, which are equally applicable across a wide range of disciplines. The user is prompted to select from a predefined set of general questions that organize content entries. The framework categorizes content entries into each of the five phases of the model, enabling knowledge management across disciplines as the collaborative environment scales up.

Figure 2:
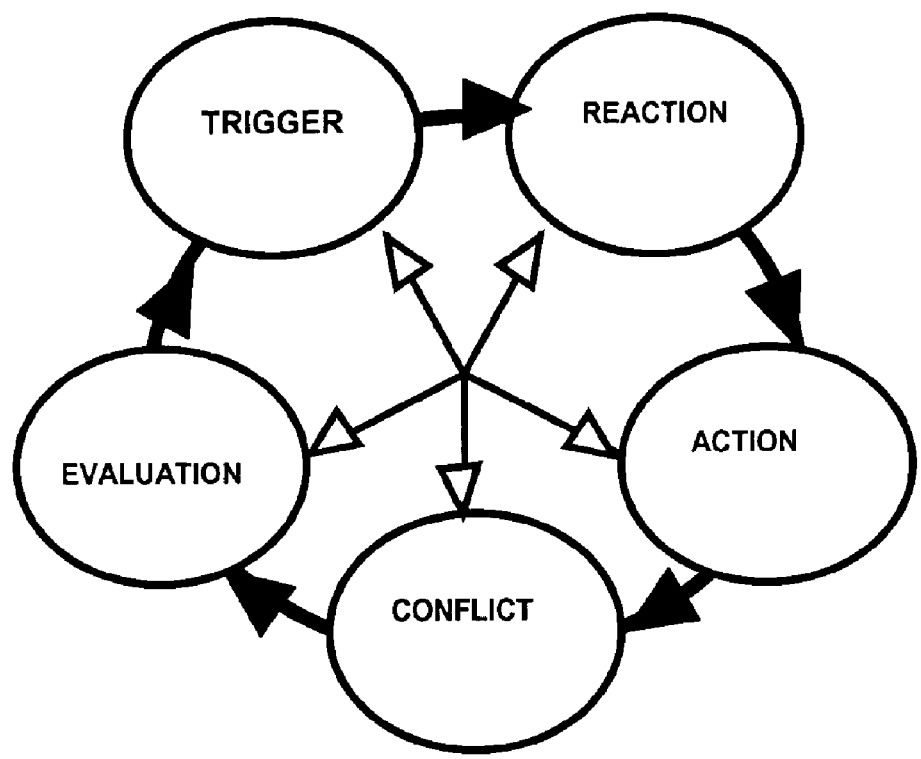
FIG. 2 is a bubble diagram showing the cyclic nature of the TRACE model and user flexibility to choose the ordering of the stages of the model.

FIG. 2 is a bubble diagram showing the cyclic nature of the TRACE model and user flexibility to choose the ordering of the stages of the model. The stages and cycle can repeat as many times as necessary. Written or spoken language prompts are used for all five stages, said method and system requiring human users or agents able to comprehend natural language prompts and to choose among alternatives or to input language data. Users interact with a pull-down menu or other device on which question boxes are checked. The user has write-in capability to extend the question base or input categories to the framework. Hence the invention is unlike prior art that gathers physical performance data, such as vibrations, to diagnose machine malfunction. As shown in FIG. 2, the TRACE Cognitive Process Model is cyclic, giving the user flexibility to enter any stage from any other and to revisit and revise stages as needed.

As shown in FIGS. 3-7, in one embodiment of the invention, the process framework consists of a series of natural language question prompts grouped into the five TRACE Cognitive Process Model stages. This process framework can be used independent of a computational or networked environment, but such environments support record-keeping and knowledge management. The process framework, with prompts to guide users through complex tasks, assures that users explore a range of options and assists both individual users and groups to structure their thought processes for better communication and collaboration.

FIG. 8 is the block diagram of an embodiment of the complementary relationship between the passive and active roles of the TRACE cognitive process model, depending upon whether the user is searching for information (passive archive mode) or recording data (active collaboration mode). The toggle system allows the user to switch easily between modes. Prior art uses "data" and "response to data," but these remain fixed categories, unlike the passive and active modes of the subject invention where what was Active may become Passive and vice versa. In the invention, the toggle function is not simply a choice between two alternatives: there is a cross-functional mapping between currently active input and the currently passive knowledge base of the system, which enables the user to see how his present work in progress relates to past work done in the system.

In the embodiment shown in FIG. 8, embedded in a webtank (think tank on the web) the TRACE cognitive model serves two complementary functions: providing process support for invention, collaborative problem-solving and authoring (active mode), and offering a knowledge management framework for information resources and project archives (passive mode). The TRACE cognitive model provides the architecture for both a brainstorming prompter (active mode) and for knowledge management and record-keeping (passive mode). Users can toggle back and forth between active and passive modes.

Because of its process-based structure, the system has broad, cross-disciplinary applicability, ranging from project development to project-based learning across disciplines. It can serve both as a process guide to support task development, and as a way to structure records after-the-fact. The TRACE Knowledge Processor can be an add-on to existing websites to augment functionality, much as search engines are add-ons; its natural language queries can be customized for varied users in a range of collaborative environments. It provides a flexible architecture that effectively combines the knowledge base of the computer system with that of the user.

Embodiments of the present invention provide for passively and actively collecting information from and about the user, implemented either through computer software or within a collaborative environment, which can be used in a range of applications, including the development and recording of plans, programs, and project ideas. Question prompts more frequently used rise in the framework, while those seldom used sink and are filtered out. The user's path through the Knowledge Processor framework is recorded and becomes part of the database of the system, which can be used to study user preferences and to support updates and refinements to the system.

Data entry is simplified, and knowledge management enabled, through a framework that automatically classifies entries according to their position in a phased problem-solving process. In the data entry mode the TRACE model provides a process-based framework to structure input. In the data retrieval mode user input is logged, not only in order to retrieve data, including, but not limited to, use by the embedded continuous survey system, profiling users in order to customize the system to respond to their needs, refine and extend system capabilities based upon how it is used and, where appropriate, to match users, e.g. to resources, opportunities, and others sharing similar interests.

The system of one embodiment enables the user to make decisions about a task through generating questions within a structured framework. The specific questions asked may be either preformulated or dynamically generated by a question procedure, which calls up a reference procedure that uses previous responses by that user and other users with similar interest profiles. Questions and answers are updated as the user moves through the system.

The embedded continuous survey capability enables data gathering to be organized from a user perspective, from a technical perspective and/or from a content perspective. Documenting technical changes entails "tracking clicks," which can be automated. Each computer-registered action can be documented and linked to the person responsible for that action. In data gathering from a content perspective, each decision is documented, together with the rationale for that decision, including the alternatives that were not chosen. Quantifiable components of content assessment include who's talking to whom and for how long. Pattern-related components include patterns of clustering around documents, how strands evolve, and how key concepts emerge and move through the group, helping to determine what tasks agents can handle. A hypothesis that has an unpredicted impact on a simulation can be archived in Knowledge Processor memory and made available to future users.

Documentation of process events and user interaction can be linked to an assessment plan to inform human/agent decisions about how to modify the record-keeping strategy and guide Knowledge Processor evolution. Beyond tracking human/agent collaboration, Knowledge Processor modifications can be tracked. Through Knowledge Processor evolution both its code and its environment will change, each change affecting its capability to respond to user needs: Is the change a bug or a constructive mutation? Methods to store, view, and use performance data need to be developed to support Knowledge Processor tuning, modification, and extension as Processor intelligence emerges.

The present invention is intended for use in conjunction with traditional methods of query and search. When used as a complementary system, the present invention provides tools and protocols to enable large communities to aggregate and access shared information and knowledge. The present invention makes knowledge-sharing coincident with knowledge development, as users add content to its Knowledge Processor, in a typical embodiment via a web environment.

In one embodiment, natural language questions and responses are displayed as text, and may be displayed through various vehicles, such as audio or printing devices. How the active player defines the view and navigates through a scenario impacts the participation of all other collaborators and the playout of the scenario. Natural language questions may be asked and responded to in any order preferred by the user. New questions are generated by the system based upon user responses and task sequencing. A range of input devices can serve as multiple tracking streams: speech, light pointers, touch screens, click records. Sensors can also be used in an immersive embodiment of the Knowledge Processor. Sound tracking can provide and collect information from users. The level of tracking and record-keeping can be specified, depending on the importance of the task and its assessment, and the need for process records.

The TRACE Cognitive Model enables the Knowledge Processor to learn through responding to its users. Documentation of webtank collaborative problem-solving sessions, self-assessment of performance, and adaptive response together support emergent intelligence in this distributed system.

The parameters of the system can be adjusted in response to feedback from users.

Natural language question prompts that are frequently used rise in priority. Those that attract less use can be modified to be more effective, as confirmed by their rise in the system.

Users can input their own profile information, which the Integration Broker uses in a range of ways, including matching users with relevant knowledge to share and project team-building.

In one embodiment, a toggle button is used, which can be a graphical user interface where the active, or collaboration mode, and the passive, or information mode, both follow structured stages, such as the five TRACE stages. Both modes, and the five TRACE stages, are represented in one embodiment by graphic icons incorporated into a graphical user interface. The passive mode can include capacity to search for input from prior users. In a preferred embodiment, structured process stages, such as those of the TRACE model, enable cross-project searches to identify opportunities for knowledge exchange at each process stage, i.e. users can search for projects with similar triggers, noting how the reaction stage was handled for each and learning from past project experience recorded in the Knowledge Processor.

In one embodiment, the structured stages for multiple projects can be overlaid and displayed in a color-coded map, allowing the viewer quickly to see parallels across projects and to identify where cross-project knowledge-sharing would be useful.

Foregoing described embodiments of the invention are provided as illustrations and descriptions. They are not intended to limit the invention to the precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

I claim:

1. A computer implemented method for process data management, wherein said method can be implemented on computers using the internet, intranet, wireless communication network or mobile devices, the method comprising:

(a) displaying a set of natural language prompts related to a problem for each of a plurality of structured stages;
(b) receiving input in response to the prompts;
(c) using project stages as a reference system for interface design; and
(d) supporting transaction and collaboration among a plurality of users.

2. The method of claim 1, wherein the displaying (a) comprises:
  (a1) displaying a set of natural language trigger questions relating to identification of triggers for a problem and receiving responses to the set of trigger questions; and
  (a2) displaying a set of natural language reaction questions relating to collection of reactions to the triggers and receiving responses to the set of reaction questions.

3. The method of claim 2, wherein the displaying (a1) comprises:
  (a1i) displaying a series of menus comprising the trigger questions.

4. The method of claim 2, wherein the displaying (a2) comprises:
  (a2i) displaying a series of menus comprising the reaction questions.

5. The method of claim 1, wherein the receiving (b) comprises:
  (b1) receiving inputs of action steps to address the problem based on the triggers and the reactions.

6. The method of claim 5, wherein the receiving (b1) comprises:
  (b1i) displaying a series of menus comprising questions to identify one or more action steps.

7. The method of claim 1, further comprising (e) generating a map based on the responses wherein the generating (c) comprises:
  (e1) identifying conflicts, competitive issues, contingency based on the triggers, the reactions, and the action steps;
  (e2) generating a map based on the triggers, reactions, action steps, and conflicts; and
  (e3) displaying prompts for evaluating the problem based on prior inputs and supported by mapping the problem-solving process.

8. The method of claim 7, wherein the identifying (e1) further comprises:
  (e1i) methods to filter inputs, a map of alternative problem-solving strategies and representation of hazards and risks and identification of conflicting data and priorities.

9. The method of claim 7, wherein the map comprises connections between the triggers, reactions, action steps, conflicts and their relationships.

10. The method of claim 1, wherein each stage may be performed, repeated, or executed in any order.

11. The method of claim 1, further comprising:
  (e) using a process map as a template for data input and as a framework for storing said data such that the data can be retrieved wherein said retrieval is by conventional methods of key word search, by its position in the TRACE Cognitive Model, or other cognitive process framework.

12. The method of claim 11, wherein the stored data is categorized.

13. The method of claim 12, wherein categorized data supports effective data queries for cross-disciplinary knowledge building.

14. The method of claim 11, wherein the stored data is time stamped.

15. The method of claim 14, wherein the time stamped data supports process record-keeping, content tagging, content tracking and knowledge management.

16. The method of claim 1, wherein the method is implemented for at least one of the following:
  project management;
  collaboration facilitation;
  work process monitoring and tracking;
  learning curriculum; or
  knowledge management.

17. The method of claim 1, further comprising:
  (e) collaborative transaction capability and support for collaboration among a plurality of users, said users working synchronously or asynchronously, distributed or in one location.

18. The method of claim 1, wherein the method is implemented in an Intranet or other controlled communication system, allowing different levels of access and privacy to support teams working on confidential projects to converge systematically toward shared plans or problem resolutions.

19. The method of claim 1, further comprising:
  (e) a toggle between an active and a passive mode, wherein the active mode categorizes and orders inputs received in any of the stages, wherein the passive mode allows for navigating and searching the inputs.

20. The method of claim 1, wherein in the active mode, inputs are logged and operations can be performed on the inputs.

21. The method of claim 20, wherein in the passive mode, natural language searches of inputs in information resources and knowledge archives is provided, wherein said natural language searches are used to augment the active input of the user.

22. The method of claim 1, wherein a user's path is recorded and stored and can be compared with other user paths.

23. The method of claim 22, wherein the stored path and other user input is used in a variety of ways, including to study user preferences and support updates and refinements to a knowledge processor.

24. A computer implemented method for process data management, comprising:
  (a) displaying a set of natural language prompts related to a problem for each of a plurality of structured stages, wherein the prompts are dynamically generated based on previously received responses;
  (b) receiving input in response to the prompts; and
  (c) generating a map based on the responses;
wherein the method is implemented as an Internet-based system further comprising:
  (d) collaborative transaction capability and support for collaboration among a plurality of users.

* * * * *